United States Patent
Iwao et al.

(10) Patent No.: US 8,880,307 B2
(45) Date of Patent: Nov. 4, 2014

(54) COASTING CONTROL DEVICE

(75) Inventors: Nobuyuki Iwao, Fujisawa (JP); Yasushi Yamamoto, Fujisawa (JP); Kazuhiko Kobayashi, Yokohama (JP); Hiroyuki Arai, Yokohama (JP); Kouhei Takama, Yokohama (JP)

(73) Assignees: Isuzu Motors Limited, Tokyo (JP); Transtron Inc., Yokohama-Shi (JP)

( * ) Notice: Subject to any disclaimer, the term of this patent is extended or adjusted under 35 U.S.C. 154(b) by 27 days.

(21) Appl. No.: 13/807,779

(22) PCT Filed: Jul. 1, 2011

(86) PCT No.: PCT/JP2011/065181
§ 371 (c)(1),
(2), (4) Date: Dec. 31, 2012

(87) PCT Pub. No.: WO2012/002533
PCT Pub. Date: Jan. 5, 2012

(65) Prior Publication Data
US 2013/0116899 A1   May 9, 2013

(30) Foreign Application Priority Data

Jul. 2, 2010   (JP) ................................. 2010-152123

(51) Int. Cl.
G06F 7/00   (2006.01)
G06F 17/00   (2006.01)
(Continued)

(52) U.S. Cl.
CPC ......... *B60W 30/18072* (2013.01); *B60W 10/06* (2013.01); *F16H 61/16* (2013.01); *F16D 2500/30415* (2013.01); *F16D 2048/0254* (2013.01); *F02D 29/02* (2013.01); *F16D 2500/70424* (2013.01); *B60W 10/10* (2013.01); *B60W 10/11* (2013.01); *F02D 11/04* (2013.01); *F16D 48/06* (2013.01); *F16D 2500/5085* (2013.01); *F16D 2500/50293* (2013.01); *B60W 50/12* (2013.01); *B60W 2030/1809* (2013.01); *F16D 2500/3067* (2013.01); *F02D 41/12* (2013.01); *F16D 48/066* (2013.01); *F16D 2500/3144* (2013.01); *F16H 61/22* (2013.01);
(Continued)

(58) Field of Classification Search
CPC . B60W 10/08; B60W 20/00; B60W 2540/10; B60W 20/40; G06F 17/00; G06F 19/00; G06F 7/00; F02D 41/023; F02D 2200/501; F02D 29/02; F02D 41/0215
USPC ............. 701/54, 102, 53, 87, 95; 477/107, 84
See application file for complete search history.

(56) References Cited

U.S. PATENT DOCUMENTS 5,839,988 A * 11/1998 Marusue et al. .............. 477/130
5,855,534 A * 1/1999 Bates ............................ 477/120
(Continued)

FOREIGN PATENT DOCUMENTS

DE         41 18 519          2/1993
DE     10 2007 012875          9/2008
(Continued)

OTHER PUBLICATIONS

International Search Report of Corresponding PCT Application PCT/JP2011/065181 mailed Sep. 6, 2011.
(Continued)

*Primary Examiner* — Calvin Cheung
*Assistant Examiner* — Luis A Martinez Borrero
(74) *Attorney, Agent, or Firm* — Staas & Halsey LLP (57) ABSTRACT

A coasting control device for avoiding dangerous modes such as tire lock up upon the end of coasting control. The device, which performs coasting control to disengage the clutch and to reduce the engine revolutions per minute (RPM), also prevents a gearshift operation during coasting control.

1 Claim, 6 Drawing Sheets

(51) Int. Cl.

| | | |
|---|---|---|
| *G06F 19/00* | (2011.01) | |
| *B60W 10/06* | (2006.01) | |
| *B60W 30/18* | (2012.01) | |
| *F16H 61/16* | (2006.01) | |
| *F02D 29/02* | (2006.01) | |
| *B60W 10/10* | (2012.01) | |
| *B60W 10/11* | (2012.01) | |
| *F02D 11/04* | (2006.01) | |
| *F16D 48/06* | (2006.01) | |
| *B60W 50/12* | (2012.01) | |
| *B60W 10/02* | (2006.01) | |
| *F16D 48/02* | (2006.01) | |
| *F02D 41/12* | (2006.01) | |
| *F16H 61/22* | (2006.01) | |
| *F16H 59/18* | (2006.01) | |

(52) U.S. Cl.
CPC ..... *F16D 2500/506* (2013.01); *F16H 2061/163* (2013.01); *F16D 2500/3065* (2013.01); *B60W 10/02* (2013.01); *F16H 2059/186* (2013.01)
USPC .............. 701/54; 701/53; 701/87; 701/95; 477/84; 477/107

(56) References Cited

U.S. PATENT DOCUMENTS

| | | | | |
|---|---|---|---|---|
| 6,090,008 | A * | 7/2000 | Hoshiya et al. | 477/84 |
| 6,494,809 | B1 * | 12/2002 | Suzuki et al. | 477/107 |
| 6,625,534 | B2 * | 9/2003 | Suzuki et al. | 701/62 |
| 7,089,102 | B2 * | 8/2006 | Slayton et al. | 701/51 |
| 7,549,946 | B2 * | 6/2009 | Ayabe et al. | 477/107 |
| 7,698,042 | B2 * | 4/2010 | Shimizu et al. | 701/51 |
| 8,340,888 | B2 * | 12/2012 | Kociba et al. | 701/110 |
| 8,357,073 | B2 * | 1/2013 | Iwase et al. | 477/3 |
| 8,366,587 | B2 * | 2/2013 | Inoue et al. | 477/110 |
| 8,423,261 | B2 * | 4/2013 | Swartling et al. | 701/102 |
| 8,538,644 | B2 * | 9/2013 | Whitney et al. | 701/54 |
| 2003/0027685 | A1 * | 2/2003 | Watanabe et al. | 477/107 |
| 2003/0060330 | A1 * | 3/2003 | Sato et al. | 477/174 |
| 2003/0203790 | A1 * | 10/2003 | Matsubara et al. | 477/107 |
| 2004/0138027 | A1 | 7/2004 | Rustige et al. | |
| 2007/0010927 | A1 * | 1/2007 | Rowley et al. | 701/51 |
| 2007/0179017 | A1 * | 8/2007 | Yamada et al. | 477/107 |
| 2007/0225114 | A1 * | 9/2007 | Rzepecki et al. | 477/107 |
| 2008/0200303 | A1 * | 8/2008 | Tabata et al. | 477/107 |
| 2009/0240407 | A1 * | 9/2009 | Thor | 701/54 |
| 2010/0057311 | A1 * | 3/2010 | Okazaki et al. | 701/54 |
| 2010/0131160 | A1 * | 5/2010 | Ayabe et al. | 701/54 |
| 2010/0145593 | A1 * | 6/2010 | Swartling et al. | 701/102 |
| 2010/0151991 | A1 | 6/2010 | Mair et al. | |
| 2011/0118955 | A1 * | 5/2011 | Livshiz et al. | 701/103 |
| 2011/0178691 | A1 * | 7/2011 | Wang et al. | 701/102 |
| 2012/0150399 | A1 * | 6/2012 | Kar et al. | 701/54 |

FOREIGN PATENT DOCUMENTS

| | | |
|---|---|---|
| DE | 10 2007 047804 | 5/2009 |
| JP | 8-67175 | 3/1996 |
| JP | 2006-44630 | 2/2006 |
| JP | 2006-342832 | 12/2006 |

OTHER PUBLICATIONS

Patent Abstracts of Japan, Publication No. 2006-342832, Published Dec. 21, 2006.
Patent Abstracts of Japan, Publication No. 2006-044630, Published Feb. 16, 2006.
Patent Abstracts of Japan, Publication No. 08-067175, Published Mar. 12, 1996.
Espacenet English Abstract of German Application No. 41 18 519 published Feb. 4, 1993.
Espacenet English Abstract of German Application No. 10 2007 047 804 published May 20, 2009.
Supplementary European Search Report in Application No. 11800995.0 dated Nov. 29, 2013.
International Preliminary Report on Patentability mailed Feb. 12, 2013 for corresponding International Application No. PCT/JP2011/065181.
Written Opinion of the International Searching Authority mailed Sep. 6, 2011 for corresponding International Application No. PCT/JP2011/065181.

* cited by examiner

COASTING CONTROL DEVICE

CROSS-REFERENCE TO RELATED APPLICATIONS

This application claims the benefit of Japanese Patent Application No. 2010-152123, filed on Jul. 2, 2010, the contents of which is incorporated herein by reference, which serves as priority for PCT Application No. PCT/JP2011/065181, filed Jul. 1, 2011.

BACKGROUND OF THE INVENTION

1. Technical Field

The present invention relates to a coasting control device capable of avoiding dangerous modes such as tire locking up upon the end of coasting control.

2. Background Art

When the accelerator pedal of a vehicle is pressed while the clutch is disengaged, the accelerator (throttle) is opened to cause the engine to run at "idle" and the engine RPM (the number of revolutions of the engine) is stabilized at the engine RPM corresponding to the accelerator opening degree (accelerator position). At that point in time, the driving force generated by the engine and the internal resistance (friction) of the engine are in equilibrium and the engine output torque is 0. That is, the engine does no work for the outside the engine and fuel is wasted.

The engine does no work for the outside not only during idling caused by disengagement of the clutch as described above but also while the vehicle is in motion. In this situation, the engine only revolves at an engine RPM corresponding to the accelerator opening degree as in idling and does not contribute to acceleration or deceleration of the vehicle. Accordingly, the fuel is consumed only in causing the engine to revolve uselessly, which is highly wasteful.

The present applicant has proposed a coasting control device that performs coasting control that disengages the clutch and places the engine in idle state to save fuel consumption while the engine is running but is doing no work for the outside the engine (Patent Document 2).

Coasting control is a technique, employed in a vehicle equipped with a mechanism capable of automatically disengaging the clutch, to improve fuel economy by automatically disengaging the clutch to reduce the engine RPM to an idle RPM or an RPM equivalent to that while the engine is revolving but doing no work for the outside the engine.

Since coasting control can be used in any vehicle that is capable of automatically turning off the engine output (automatically disengaging the clutch) as described above, the same effect can be achieved not only in a manual clutch system (manual T/M) but also in an automatic clutch system (conventional torque converter AT or AMT).

PRIOR ART DOCUMENTS

Patent Document 1: Japanese Patent Application Publication No. 8-67175
Patent Document 2: Japanese Patent Application Publication No. 2006-342832

SUMMARY OF THE INVENTION

However, the technique described in Patent Document 2 may disengage the clutch while a driver is pressing the accelerator pedal in an attempt to accelerate. Accordingly, the driver may feel torque reduction and uneasiness while switching from deceleration to acceleration.

BRIEF DESCRIPTION OF THE DRAWINGS

To address this, the present applicant has prepared a coasting control judgment map which uses as measures the degree of opening of the accelerator and the clutch rotation speed and has proposed a coasting control device that starts coasting control when the coordinate points of the accelerator opening degree and the clutch rotation speed have passed a preset coasting control threshold line toward a direction in which the degree of opening of the accelerator decreases.

In a coasting control device, coasting control is performed regardless of the intention of the driver when predetermined conditions are satisfied. Accordingly, usually the driver is not aware that coasting control is being performed. Therefore, the driver of a vehicle that uses a manual T/M or ATM as the clutch system may perform a gearshift operation (operation of a shift lever) during coasting control. Furthermore, the driver may unintentionally operate the shift lever while the driver is driving with his/her hand on the shift lever. Since the vehicle is mechanically disengaging the clutch during coasting control, the driver can shift to another gear simply by performing a gearshift operation during coasting control.

However, when the driver shifts to a low-speed gear (downshift) during running at high speed, the RPM on the load side becomes significantly higher than the engine RPM. Accordingly, when the clutch is engaged upon the end of coasting control, tires can dangerously lock up due to the shock.

An object of the present invention is to solve the problem and provide a coasting control device capable of avoiding dangerous modes such as tire locking up upon the end of coasting control.

The present invention has been made to achieve these objects and provides a coasting control device which performs coasting control to disengage a clutch and reduce the RPM's of an engine to an RPM when the engine is doing no work for the outside of the engine while the vehicle is in motion. The coasting control device includes a gearshift prevention device for preventing a gearshift operation during coasting control.

The gearshift prevention device may include a lock mechanism capable of mechanically locking a shift lever, and a gearshift prevention control unit controlling the lock mechanism so that while coasting control is being performed, the shift lever is mechanically locked to prevent a gearshift operation and while coasting control is not being performed, the shift lever is unlocked to allow a gearshift operation.

The lock mechanism may be a shift-lock solenoid.

The present invention can provide a coasting control device capable of avoiding dangerous modes such as tire locking up upon the end of coasting control.

DESCRIPTION OF THE EMBODIMENTS

Embodiments of the present invention will be described below with reference to the accompanying drawing.

Figure 1:
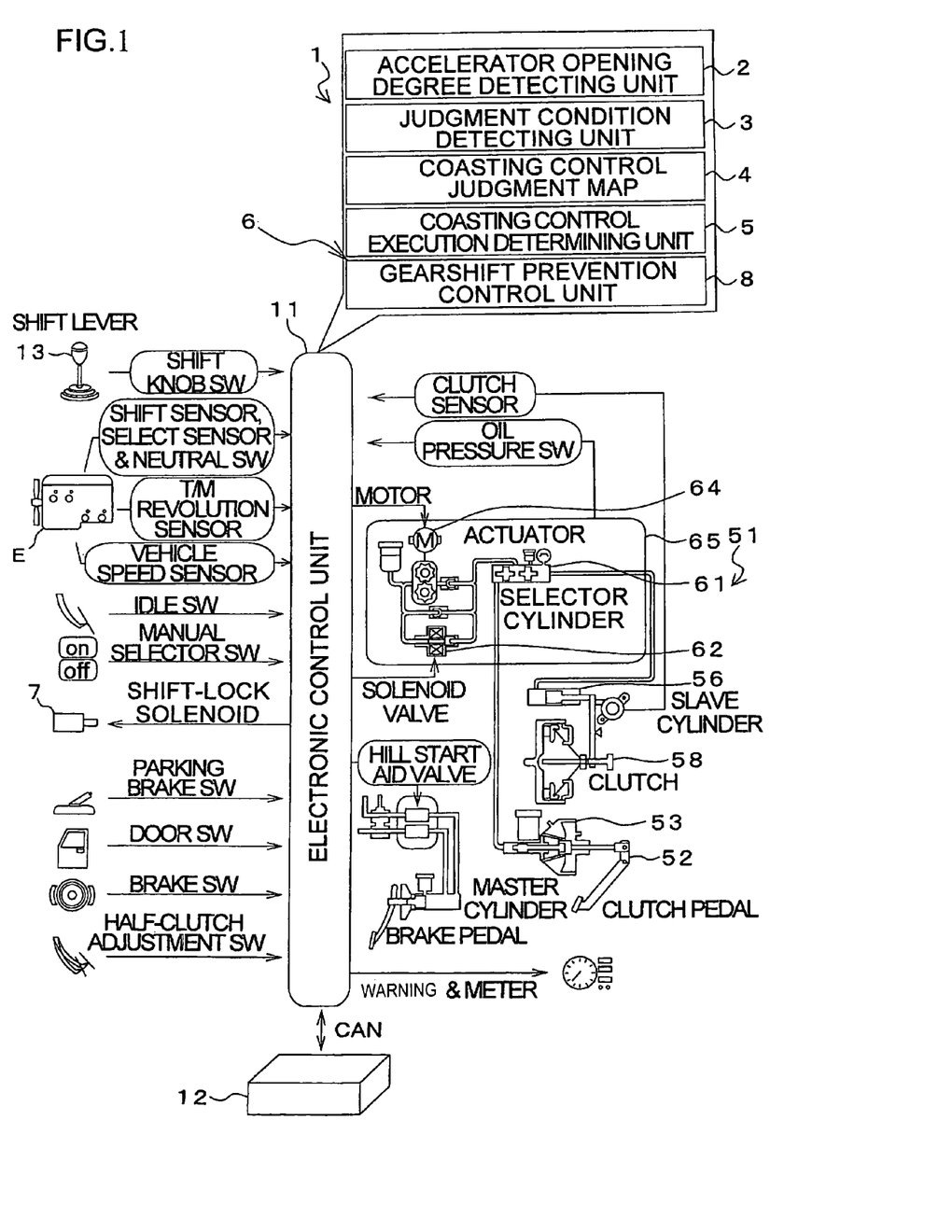
FIG. 1 is an input/output configuration diagram of a vehicle to which a coasting control device of the present invention is applied.

FIG. 1 is an input/output configuration diagram of a vehicle to which a coasting control device according to the present invention is applied.

As illustrated in FIG. 1, the vehicle includes an electronic control unit 11, which primarily controls a transmission and a clutch, and an ECM (Engine Control Module) 12, which primarily controls an engine E.

Connected to the electronic control unit 11 are the input signal lines for a shift knob switch, a transmission shift sensor, a select sensor, a neutral switch, a T/M revolution sensor, a vehicle speed sensor, an idle switch, a manual selector switch, a parking brake switch, a door switch, a brake switch, a half-clutch adjustment switch, a clutch sensor, and an oil pressure switch. Output signal lines for a motor for a hydraulic pump 64 and a solenoid valve 62, a hill start aid valve, and a warning and meter of a clutch system 51 are also connected to the electronic control unit 11.

Various input signal lines and output signal lines, not depicted, used for engine control are connected to the ECM 12. The ECM 12 is capable of sending engine RPM, accelerator opening degree, and engine RPM change request signals to the electronic control unit 11 through CAN (Controller Area Network) transmission lines.

Here, the clutch system of the vehicle will be described.

Figure 2:
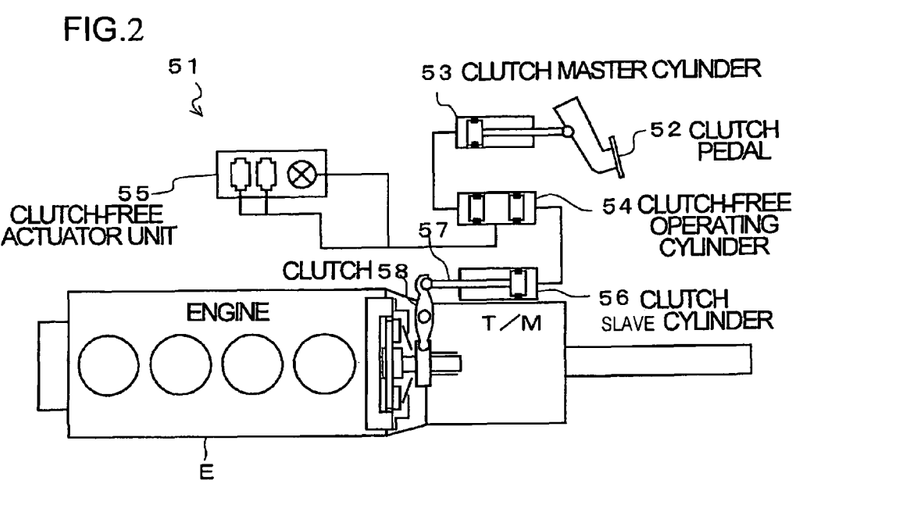
FIG. 2 is a block diagram of a clutch system of a vehicle to which the coasting control device of the present invention is applied.

As illustrated in FIG. 2, a clutch system 51 of the vehicle is a dual-mode clutch system operating in a manual mode and an automatic mode controlled by the electronic control unit 11. A clutch master cylinder 53 mechanically coupled to a clutch pedal 52 is designed to supply hydraulic oil to a clutch-free operating cylinder 54. On the other hand, a clutch-free actuator unit 55 controlled by the electronic control unit 11 is also designed to supply hydraulic oil to the clutch-free operating cylinder 54. The clutch-free operating cylinder 54 is designed to supply hydraulic oil to a clutch slave cylinder 56. A piston 57 of the clutch slave cylinder 56 is mechanically coupled to a movable part of the clutch 58.

Figure 3:
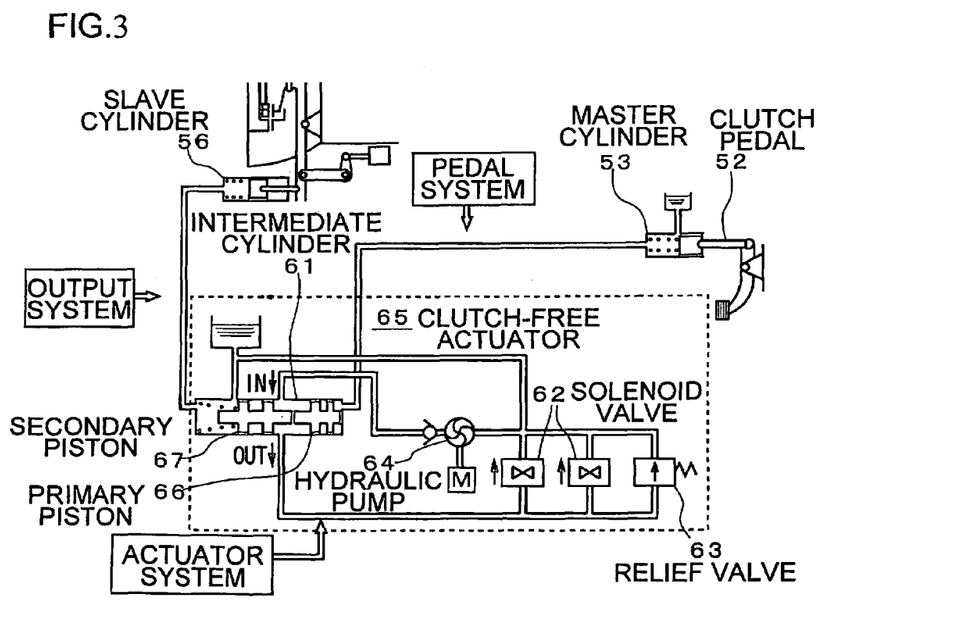
FIG. 3 is a diagram illustrating a configuration of an actuator that implements the clutch system in FIG. 2.

As illustrated in FIG. 3, an intermediate cylinder 61 which is the clutch-free operating cylinder 54 in FIG. 2, and the solenoid valves 62, a relief valve 63 and the hydraulic pump 64 which make up the clutch-free actuator unit 55 are provided in a clutch-free actuator 65. The intermediate cylinder 61 includes a primary piston 66 and a secondary piston 67 arranged in series. As hydraulic oil from the clutch master cylinder 53 causes the primary piston 66 to stroke, the secondary piston 67 strokes accordingly. Hydraulic oil from the clutch-free actuator unit 55 also causes the secondary piston 67 to stroke. In response to the stroke of the secondary piston 67, hydraulic oil is supplied to the clutch slave cylinder 56. When a manual operation is performed in this configuration, the clutch is disengaged or engaged according to the manual operation in priority over automatic control; when no manual operation is performed, disengagement or engagement of the clutch is performed according to a control of the electronic control unit 11.

While an automatic and manual dual-mode clutch system has been described here, an automatic clutch system (ATM) may be used.

A coasting control device according to the present invention will be described below.

A coasting control device 1 which performs coasting control to disengage the clutch and decrease the engine RPM to an idle RPM (or an RPM equivalent to the idle RPM) when the engine does no work for the outside of the engine during moving is installed in the vehicle.

The operation principle of coasting control will be described first with reference to FIG. 4. The horizontal axis of FIG. 4 represents time and the flow of control and the vertical axis represents the engine RPM.

Figure 4:
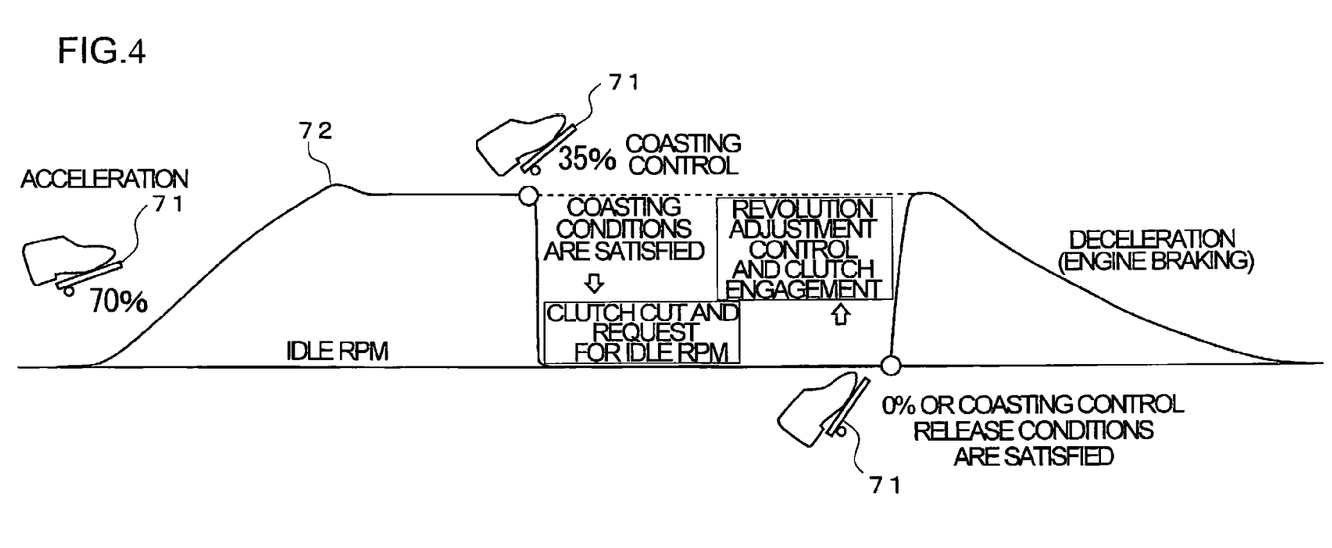
FIG. 4 is a conceptual operation diagram illustrating an overview of coasting control according to the present invention.

As illustrated in FIG. 4, while an accelerator pedal 71 is pressed down and the accelerator opening degree increases and stays at 70%, the engine RPM 72 increases to accelerate the vehicle. When the engine RPM 72 stabilizes and the amount of depression of the accelerator pedal 71 decreases to reduce the accelerator opening degree to 35%, conditions for starting coasting control, which will be described later, are satisfied. When coasting control is started, the clutch is disengaged and the engine RPM 72 is controlled to the idle RPM. Suppose that subsequently the accelerator pedal 71 is released and the accelerator opening degree decreases to 0% or other conditions for terminating coasting control are satisfied. Upon termination of the coasting control, the engine revolution is controlled and the clutch is engaged. Since the accelerator opening degree is 0% in this example, an engine braking state is entered to decelerate the vehicle.

If coasting control were not performed, the engine would be maintained at a high RPM as indicated by the dashed line during the coasting control and fuel would be wasted accordingly. Coasting control reduces the engine RPM 72 to the idle RPM, thereby saving fuel.

Returning to FIG. 1, specifically, the coasting control device 1 includes an accelerator opening degree detecting unit (accelerator position detecting unit) 2 which digitally samples an output signal from an accelerator opening degree sensor (accelerator position sensor) at predetermined time intervals and provides moving averages as accelerator opening degrees at the predetermined time intervals, a judgment condition detecting unit 3 which differentiates the accelerator opening degrees obtained at the predetermined time intervals to determine an accelerator opening speed and, when the accelerator opening degree is negative and its absolute value is smaller than a preset start reference value, permits the judgment of starting coasting control, a coasting control judgment map 4 which uses the accelerator opening degree and clutch rotation speed as measures and on which a coasting control threshold line is set along an engine output torque zero line (no-load line) which is the boundary between a negative region where the engine output torque is negative and a positive region where the engine output torque is positive, and a coasting control execution determining unit 5 which starts coasting control when the judgment of starting coasting control has been permitted and the coordinate points of the accelerator opening degree and clutch rotation speed have passed the coasting control threshold line in the direction in which the accelerator opening degree decreases.

Here, the clutch rotation speed is the number of rotations of the clutch on the driven side and is equal to the number of rotations of the input shaft of the transmission. In the present embodiment, a clutch rotation speed sensor is provided on the input shaft and the clutch rotation speed is detected from the number of rotations of the input shaft.

The accelerator opening degree detecting unit 2, the judgment condition detecting unit 3, the coasting control judgment map 4 and the coasting control execution determining unit 5 are preferably provided in the electronic control unit 11.

Figure 5:
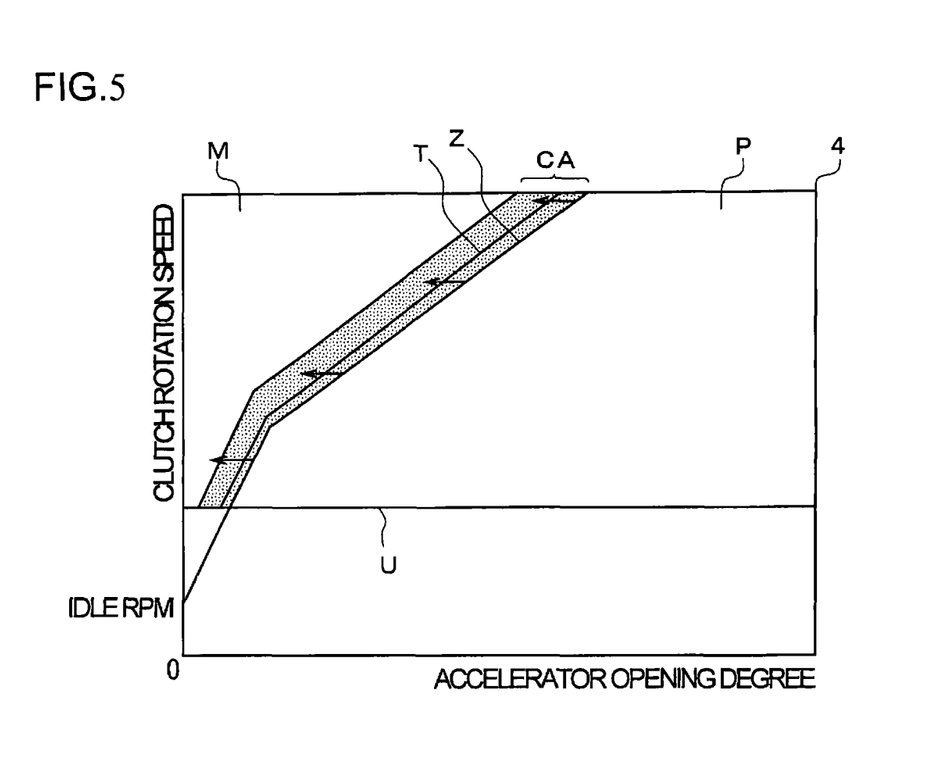
FIG. 5 is a graph image diagram of a coasting control judgment map according to the present invention.

FIG. 5 shows a graph image of the coasting control judgment map 4.

The coasting control judgment map 4 is prepared by measuring beforehand the correlation between the accelerator opening degree and the clutch rotation speed for the engine while the clutch is disengaged.

As illustrated in FIG. 5, the coasting control judgment map 4 is a map with the horizontal axis representing the accelerator opening degree and the vertical axis representing the clutch rotation speed. The coasting control judgment map 4 can be divided into two regions: a negative region M where the engine output torque is negative and a positive region P where the engine output torque is positive. Specifically, the negative region M is a region where the engine output torque is negative because the friction of the engine is greater than a demanded engine torque. The positive region P is a region where the engine output torque is positive because the demanded engine torque is greater than the friction of the engine. The engine output torque zero line (no-load line) Z which is the boundary between the negative region M and the positive region P represents a state in which the engine is doing no work for the outside the engine and fuel is being wasted.

In the present embodiment, the coasting control threshold line T is set slightly to the left of the engine output torque zero line Z (on the side where the accelerator opening degree is small) on the coasting control judgment map 4.

A coasting control available region CA having a finite width including the coasting control threshold line T is set between the negative region M and the position region P on the coasting control judgment map 4.

A clutch rotation speed lower threshold line U is set on the coasting control judgment map 4. The lower threshold line U defines the lower threshold value of the clutch rotation speed independently of the accelerator opening degree. As illustrated, the lower threshold line U is set slightly above the clutch rotation speed in the idle state.

The coasting control device 1 starts coasting control when all of the following four coasting start conditions are satisfied.

(1) The speed of operation of the accelerator pedal is within the thresholds.

(2) The coasting control threshold line T on the coasting control judgment map 4 has been passed in the direction in which the accelerator pedal is released.

(3) Points plotted on the coasting control judgment map 4 are in the coasting control available region CA.

(4) The clutch rotation speed is above or on the lower threshold line U on the coasting control judgment map 4.

The coasting control device 1 ends coasting control when at least one of the following two coasting control end conditions is satisfied.

(1) The speed of operation of the accelerator pedal is beyond the thresholds.

(2) Points plotted on the coasting control judgment map 4 are out of the coasting control available region CA.

Figure 6:
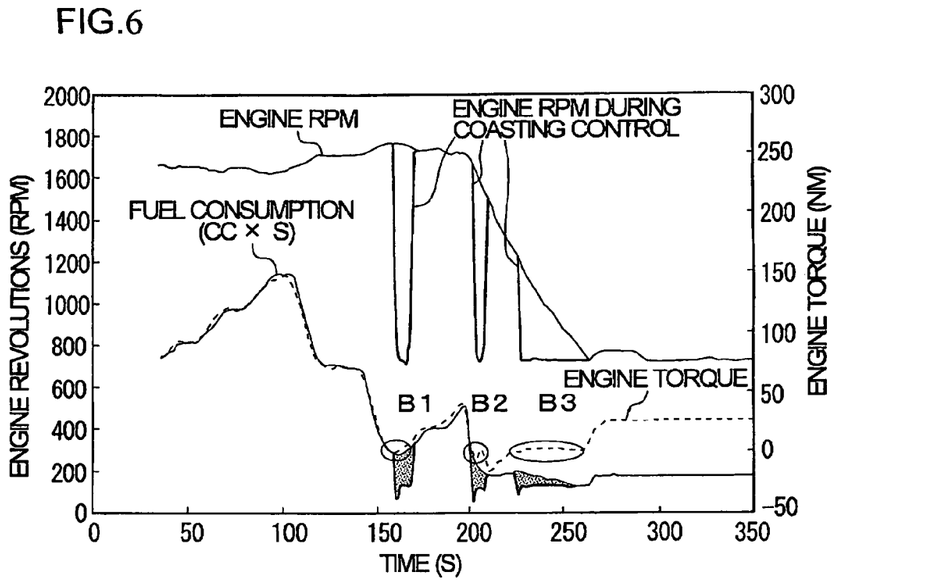
FIG. 6 is a graph illustrating a fuel saving effect of coasting control according to the present invention.

Fuel saving effects of the coasting control will be described with reference to FIG. 6.

It is assumed first that coasting control is not performed. The engine RPM is varying in the range from 1600 to 1700 rpm in the period from approximately 30 s to approximately 200 and is decreasing from approximately 1700 rpm to approximately 700 rpm (idle rpm) in the period from approximately 200 s to approximately 260 s.

The engine torque is increasing in the period from approximately 30 s to approximately 100 s, then decreasing until approximately 150 s. The engine torque is approximately 0 Nm in the period from approximately 150 s to approximately 160 s (ellipse B1), in the period from approximately 200 s to approximately 210 s (ellipse B2), and in the period from approximately 220 s to approximately 260 s (ellipse B3).

The fuel consumption (which is not marked on the vertical axis but overlaid on the engine torque for convenience) changes substantially according to change in the engine torque in the period from approximately 50 s to approximately 200 s. The power consumption is not 0 even when the engine torque is approximately 0 Nm.

It is assumed that coasting control is performed here. The engine RPM is controlled by the idle RPM in the period in which the engine torque is approximately 0 Nm. In the graph, the line (thick solid line) that branches from the line (solid line) representing the engine RPM when not performing coasting control represents the engine RPM during coasting control. The coasting control was performed three times in the periods in ellipses B1, B2 and B3. The fuel consumptions in the periods in which coasting control was being performed is lower than the fuel consumption when coasting control was not performed, showing that fuel was saved.

Figure 7:
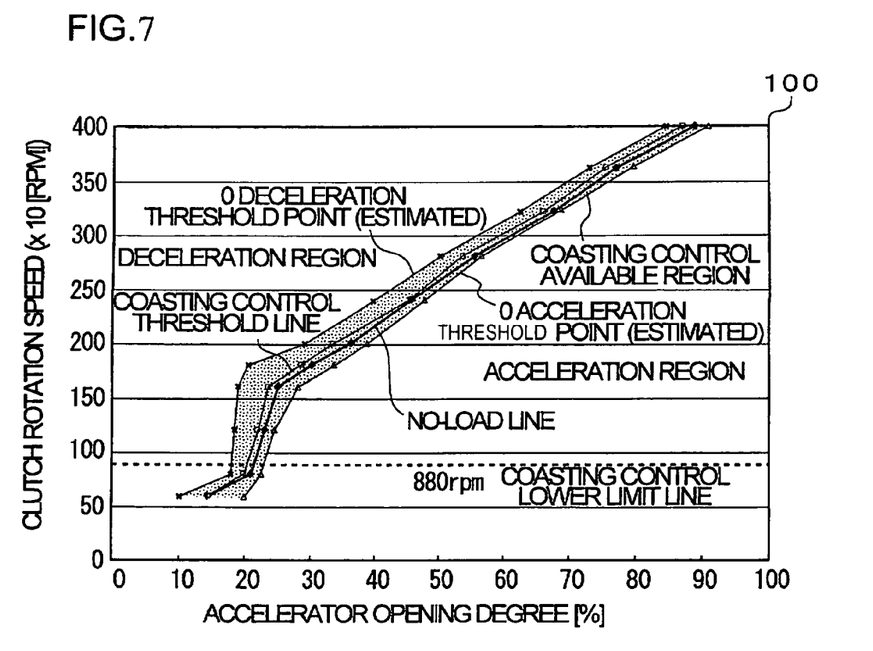
FIG. 7 is a diagram of a coasting control judgment map of coasting control actually performed according to the present invention.

FIG. 7 illustrates a coasting control judgment map 100 plotting coasting control performed actually. Points are plots of actually detected accelerator opening degrees and clutch rotation speeds. A negative region, a positive region, coasting control threshold lines (0 acceleration threshold and 0 deceleration threshold points) and a coasting control available region are set on the coasting control judgment map 100.

The coasting control device 1 according to the present invention further includes a gearshift prevention device 6 for preventing a gearshift operation during coasting control. The gearshift prevention device 6 locks the shift lever 13 to prevent shifting from the gear chosen before coasting control to another gear during the coasting control.

More specifically, the gearshift prevention device 6 includes a shift-lock solenoid 7 which is a lock mechanism capable of mechanically locking the shift lever 13 and a gearshift prevention control unit 8 which controls the shift-lock solenoid 7 so that while coasting control is being performed, the shift lever 13 is locked to prevent a gearshift operation and, while coasting control is not being performed, the shift lever 13 is unlocked to allow a gearshift operation.

The shift-lock solenoid 7 has a retractable head, which is designed to be inserted in a hole (or notch) in a plate integral with the shift lever 13 to mechanically lock the shift lever 13, thereby preventing the shift lever 13 from being operated (from moving). While the shift-lock solenoid 7 is provided near the shift lever 13 in this embodiment, the location of the shift-lock solenoid 7 is not limited to this. For example, the shift-lock solenoid 7 may be provided at any location where the shift lever 13 can be mechanically locked, such as a location on the transmission side (in a gear shift unit).

While the shift-lock solenoid 7 is used as the lock mechanism, any mechanism may be used that can mechanically lock the shift lever 13.

The gearshift prevention control unit 8 is provided in the electronic control unit 11 together with the accelerator opening degree detecting unit 2, the judgment condition detecting unit 3, the coasting control judgment map 4 and the coasting control execution determining unit 5. The gearshift prevention control unit 8 may be provided in a unit (for example the ECM 12) different from the electronic control unit 11 or may be provided in a unit different from the unit containing the accelerator opening degree detecting unit 2, the judgment condition detecting unit 3, the coasting control judgment map 4 and the coasting control execution determining unit 5.

A control flow in the gearshift prevention control unit 8 will be described with reference to FIG. 8.

Figure 8:
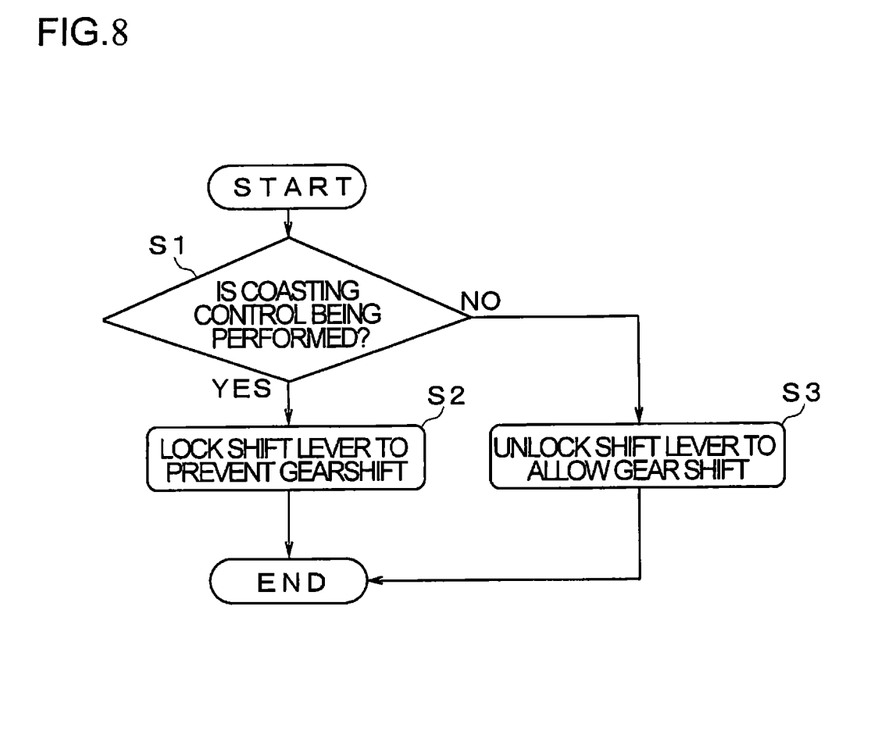
FIG. 8 is a flowchart illustrating a control flow of a coasting control device of the present invention.

As illustrated in FIG. 8, the gearshift prevention control unit 8 first determines whether or not coasting control is being performed (step S1).

If the gearshift prevention control unit 8 determines at step S1 that the coasting control is being performed (YES), the gearshift prevention control unit 8 controls the shift-lock solenoid 7 to lock the shift lever 13, thereby preventing the shift lever 13 from being operated (step S2). Thus, a gearshift is prevented during the coasting control.

If the gearshift prevention control unit 8 determines at step S1 that coasting control is not being performed (NO), the gearshift prevention control unit 8 controls the shift-lock solenoid 7 to unlock the shift lever 13, thereby allowing a gearshift operation (step S3). This enables a gearshift after the end of coasting control.

As has been described above, the coasting control device 1 according to this embodiment includes the gearshift prevention device 6 for preventing a gearshift operation during coasting control.

This can prevent the driver from shifting to a gear that can cause danger (low-speed gear) during coasting control and avoid dangerous modes such as tire locking up upon the end of coasting control.

Furthermore, when the driver is driving with his/her hand placed on the shift lever 13, the gearshift prevention device 6 can prevent unintentional gear slip-out and shifting to a dangerous gear (low-speed gear) during coasting control, thereby avoiding dangerous modes such as panic of the driver during acceleration after the end of casting control or tire locking up upon the end of coasting control.

The invention claimed is:

1. A vehicle coasting control device which performs coasting control to disengage a clutch and reduce a number of revolutions per minute of an engine to a number of idle revolutions per minute when the engine is doing no work for outside of the engine while the vehicle is in motion, the coasting control device comprising:
- a gearshift prevention device for preventing a gearshift operation during the coasting control, the gearshift prevention device including
  - a lock mechanism movable between a first position physically engaged with a gearshift lever to mechanically lock the gearshift lever and thereby prevent movement of the gearshift lever, and a second position retracted from the gearshift lever, thereby allowing the gearshift lever to move,
- wherein the lock mechanism is a shift-lock solenoid which has a retractable head physically received by the gearshift lever when in the first position; and
- a gearshift prevention controller controlling the lock mechanism so that when the coasting control is being performed, the lock mechanism is moved into the first position and, when the coasting control is not being performed, the lock mechanism is moved into the second position.

* * * * *